(12) United States Patent
Chang

(10) Patent No.: US 7,130,285 B2
(45) Date of Patent: Oct. 31, 2006

(54) METHOD FOR PROVIDING CONCURRENT SERVICE HANDOFF IN A MOBILE COMMUNICATION SYSTEM

(75) Inventor: Yong Chang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 919 days.

(21) Appl. No.: 09/833,986

(22) Filed: Apr. 12, 2001

(65) Prior Publication Data

US 2001/0030953 A1 Oct. 18, 2001

(30) Foreign Application Priority Data

Apr. 12, 2000 (KR) ............... 2000-20168
May 16, 2000 (KR) ............... 2000-27159

(51) Int. Cl.
*H04Q 7/00* (2006.01)
(52) U.S. Cl. ............ 370/331; 370/332; 370/338; 455/436
(58) Field of Classification Search ........... 370/331, 370/332, 320, 321, 329, 335, 336, 342, 441, 370/493, 494, 495, 328, 330, 344, 500, 479; 455/436, 437, 439, 443, 67.1, 450, 560, 561, 455/438, 524, 525, 517, 403, 425, 466, 442, 455/416, 414, 418, 419; 379/130, 133, 220, 379/135, 136, 141, 146, 147; 375/130
See application file for complete search history.

(56) References Cited

U.S. PATENT DOCUMENTS

| | | | | |
|---|---|---|---|---|
| 5,533,014 A * | 7/1996 | Willars et al. | ............... | 370/335 |
| 5,697,055 A * | 12/1997 | Gilhousen et al. | ........... | 455/436 |
| 5,722,074 A * | 2/1998 | Muszynski | .................... | 455/442 |
| 5,848,063 A * | 12/1998 | Weaver et al. | ............... | 370/331 |
| 5,901,354 A * | 5/1999 | Menich et al. | ............... | 455/442 |
| 5,917,811 A * | 6/1999 | Weaver et al. | ............... | 370/332 |
| 5,926,470 A * | 7/1999 | Tiedemann, Jr. | ............ | 370/334 |
| 5,937,019 A * | 8/1999 | Padovani | ..................... | 375/358 |
| 6,009,328 A * | 12/1999 | Muszynski | ................... | 455/442 |
| 6,075,989 A * | 6/2000 | Moore et al. | ............... | 455/436 |
| 6,075,990 A * | 6/2000 | Shin | ........................... | 455/440 |
| 6,078,570 A * | 6/2000 | Czaja et al. | ................. | 370/331 |
| 6,134,434 A * | 10/2000 | Krishnamurthi et al. | ..... | 455/419 |
| 6,134,444 A * | 10/2000 | Kotzin | ....................... | 455/453 |
| 6,198,929 B1 * | 3/2001 | Krishnamurthi et al. | ..... | 455/439 |
| 6,320,855 B1 * | 11/2001 | Shi | ............................. | 370/332 |
| 6,360,100 B1 * | 3/2002 | Grob et al. | ................. | 455/442 |
| 6,366,778 B1 * | 4/2002 | Bender et al. | ............. | 455/442 |
| 6,430,200 B1 * | 8/2002 | Han et al. | .................... | 370/500 |
| 6,542,743 B1 * | 4/2003 | Soliman | ..................... | 455/436 |

(Continued)

*Primary Examiner*—Seema S. Rao
*Assistant Examiner*—Jamal A. Fox
(74) *Attorney, Agent, or Firm*—Dilworth & Barrese LLP

(57) ABSTRACT

A method for performing a handoff of a mobile station (MS) from a first base station (BS) to a second BS in a mobile communication system. The first BS sends a handoff required message, which includes a service type identifier of a concurrent service of the voice and packet data and a service configuration record, to the MSC. The MSC sends the received handoff required message to the second BS. The second BS determines whether it can communicate with the MS using a radio resource specified in the service type identifier and the service configuration record, and when it cannot, sends to the MSC a new service type identifier and a new service configuration record for communicating either the voice or packet data with the MS. The MS then communicates with the second BS using the new service type identifier and the new service configuration record.

4 Claims, 18 Drawing Sheets

U.S. PATENT DOCUMENTS

| | | | |
|---|---|---|---|
| 6,549,524 B1 * | 4/2003 | Shin | 370/331 |
| 6,611,507 B1 * | 8/2003 | Hottinen et al. | 370/331 |
| 6,625,198 B1 * | 9/2003 | Tiedemann et al. | 375/130 |
| 6,628,632 B1 * | 9/2003 | Dolan | 370/332 |
| 6,633,554 B1 * | 10/2003 | Dalal | 370/331 |
| 6,766,168 B1 * | 7/2004 | Lim | 455/435.1 |
| 6,771,963 B1 * | 8/2004 | Cheng et al. | 455/437 |

* cited by examiner

| INFORMATION ELEMENT |
| --- |
| MESSAGE TYPE |
| CAUSE |
| CELL IDENTIFIER LIST(TARGET) |
| CLASSMARK INFORMATION TYPE2 |
| RESPONSE REQUEST |
| ENCRYPTION INFORMATION |
| IS-95 CHANNEL IDENTITY |
| MOBILE IDENTITY(ESN) |
| DOWNLINK RADIO ENVIRONMENT |
| SERVICE OPTION |
| CDMA SERVING ONE WAY DELAY |
| IS-95 MS MEASURED CHANNEL IDENTITY |
| IS-2000 CHANNEL IDENTITY |
| QUALITY OF SERVICE PARAMETERS |
| IS-2000 MOBILE CAPABILITIES |
| IS-2000 SERVICE CONFIGURATION RECORD |
| PDSN IP ADDRESS |
| PROTOCOL TYPE |
| PACKET ZONE ID |
| SERVICE OPTION CONNECTION REFERENCE |

FIG. 6

| 7 | 6 | 5 | 4 | 3 | 2 | 1 | 0 | Octet |
|---|---|---|---|---|---|---|---|---|
| BSMAP HEADER: MESSAGE DISCRIMINATION = [00H] ||||||||  1 |
| LENGTH INDICATOR (LI) = <VARIABLE> |||||||| 2 |
| MESSAGE TYPE = [04H] |||||||| 1 |
| CAUSE: A1 ELEMENT IDENTIFIER = [04H] |||||||| 1 |
| LENGTH = [01H] |||||||| 2 |
| ext=[0] | CAUSE VALUE = [OEH, OFH] (BETTER CELL, INTERFERENCE) ||||||| 3 |
| CELL IDENTIFIER LIST(TARGET):A1 ELEMENT IDENTIFIER = [1AH] |||||||| 1 |
| LENGTH = <VARIABLE> |||||||| 2 |
| CELL IDENTIFICATION DISCRIMINATOR=[02H,07H] |||||||| 3 |
| IF(DISCRIMINATOR=02H), CELL IDENTIFICATION {1+: |||||||| |
| (MSB) | CELL=[001H-FFFH] ||||||| j |
| | | | | (LSB) | SECTOR=[0H-FH](0H=OMINI) ||| j+1 |
| }OR IF (DISCRIMINATOR=07H), CELL IDENTIFICATION{1+: |||||||| |
| (MSB) | colspan=7 ||||||| j |
| MSCID=<ANY VALUE> |||||||| j+1 |
| | | | | | | | (LSB) | j+2 |
| (MSB) | CELL=[001H-FFFH] ||||||| j+3 |
| | | | | (LSB) | SECTOR=[0H-FH](0H=OMINI) ||| j+4 |
| }CELL IDENTIFICATION |||||||| |
| CLASSMARK INFORMATION TYPE 2:A1 ELEMENT IDENTIFIER=[12H] |||||||| 1 |
| LENGTH=<VARIABLE> |||||||| 2 |
| MOBILE P_REV =[000-111] ||| RESERVED =[0] | SEE LIST OF ENTRIES= [1] | RF POWER CAPABILITY=[000] (CLASS 1,VEHICALE & PORTABLE) ||| 3 |
| RESERVED=[00H] |||||||| 4 |
| NAR_ AN_ CAP =[0,1] | IS-95 =[1] | SLOTTED =[0,1] | RESERVED=[00] || DTX =[0,1] | MOBILE TERM =[0,1] | RESERVED =[0] | 5 |
| --CONTINUED ON Fig.7b-- |||||||| |

FIG. 7A

| --CONTINUED ON Fig.7a-- | | | | Octet |
|---|---|---|---|---|
| RESERVED=[00H] | | | | 6 |
| RESERVED=[0000 00] | | MOBILE TERM =[0,1] | PSI =[0,1] | 7 |
| SCM LENGTH=[01H-05H] | | | | 8 |
| STATION CLASS MARK=[00H-FFH] | | | | 9 |
| COUNT OF BAND CLASS ENTRIES=[01H-20H] | | | | 10 |
| BAND CLASS ENTRY LENGTH=[03H] | | | | 11 |
| MOBILE BAND CLASS CAPABILITY ENTRY {1+: | | | | |
| RESERVED=[000] | BAND CLASS n=[0000-1111] | | | k |
| RESERVED=[000] | BAND CLASS n AIR INTERFACES SUPPORTED=[0000-1111] | | | k+1 |
| BAND CLASS n MS PROTOCOL LEVEL=[00H-FFH] | | | | k+2 |
| }MOBILE BAND CLASS CAPABILITY ENTRY | | | | |
| RESPONSE REQUEST: A1 ELEMENT IDENTIFIER=[1BH] | | | | 1 |
| ENCRYPTION INFORMATION: A1 ELEMENT IDENTIFIER=[0AH] | | | | 1 |
| LENGTH=<VARIABLE> | | | | 2 |
| ENCRYPTION INFO{0..4: | | | | |
|   IF(ENCRYPTION PARAMETER IDENTIFIER=0001) {1: | | | | |
| ext=[1] | ENCRYPTION PARAMETER IDENTIFIER= [00001 (SME), 00101 (DATAKEY(ORYX)), 00110(INITIAL RAND)] | STATUS =[0,1] | AVAILABLE =[0,1] | j |
| ENCRYPTION PARAMETER LENGTH=[08H] | | | | j+1 |
| (MSB) | | | | j+2 |
| | | | | j+3 |
| | | | | j+4 |
| ENCRYPTION PARAMETER VALUE=<ANY VALUE> | | | | j+5 |
| | | | | j+6 |
| | | | | j+7 |
| | | | | j+8 |
| (LSB) | | | | j+9 |
| --CONTINUED ON Fig.7c-- | | | | |

FIG. 7B

| | Octet |
|---|---|
| --CONTINUED ON Fig.7b-- | |
| }OR IF (ENCRYPTION PARAMETER IDENTIFIER=00100){1: | |

| ext=[1] | ENCRYPTION PARAMETER IDENTIFIER=[00100] (PRIVATE LONGCODE) | STATUS =[0,1] | AVAILABLE =[0,1] | j |
|---|---|---|---|---|
| UNUSED=[000000] | | (MSB) | | j+1 |
| | | | | j+2 |
| | | | | j+3 |
| ENCRYPTION PARAMETER VALUE=<ANY VALUE> | | | | j+4 |
| | | | | j+5 |
| | | | | j+6 |
| | | | (LSB) | j+7 |

}ENCRYPTION INFO

| IS-95 CHANNEL IDENTITY: A1 ELEMENT IDENTIFIER=[22H] | | | 1 |
|---|---|---|---|
| LENGTH=<VARIABLE> | | | 2 |
| HARD HANDOFF =[1] | NUMBER OF CHANNELS TO ADD=[001] | FRAME OFFSET=[0H-FH] | 3 |

{1+:

| WALSH CODE CHANNEL INDEX=<ANY VALUE> | | | | 4 |
|---|---|---|---|---|
| PILOT PN CODE (LOW PART)=<ANY VALUE> | | | | 5 |
| PILOT PN CODE (HIGH PART) =[0,1] | POWER COMBINED =[0] | Freq. INCLUDED =[1] | RESERVED=[00] ARFCN(HIGH PART) =[000-111] | 6 |
| ARFCN(LOW PART)=[00H-FFH] | | | | 7 |

}

| MOBILE IDENTITY(ESN): A1 ELEMENT IDENTIFIER=[0DH] | | | 1 |
|---|---|---|---|
| LENGTH=[05H] | | | 2 |
| IDENTITY DIGIT 1=[0000] | ODD/EVEN INDICATOR =[0] | TYPE OF IDENTITY =[101](ESN) | 3 |
| (MSB) | | | 4 |
| ESN=<ANY VALUE> | | | 5 |
| | | | 6 |
| | | (LSB) | 7 |

| | |
|---|---|
| --CONTINUED ON Fig.7c-- | |
| DOWNLINK RADIO ENVIRONMENT: A1 ELEMENT IDENTIFIER=[29H] | 1 |
| LENGTH=<VARIABLE> | 2 |
| NUMBER OF CELLS=<VARIABLE> | 3 |
| CELL IDENTIFICATION DISCRIMINATOR=[02H,07H] | 4 |
| DOWNLINK RADIO ENVIRONMENT{1+: | |
| IF (DISCRIMINATOR=02H), CELL IDENTIFICATION{1: | |
| (MSB) CELL=[001H-FFFH] | j |
| (LSB) SECTOR=[0H-FH](0H=OMNI) | j+1 |
| }OR IF(DISCRIMINATOR=07H), CELL IDENTIFICATION {1: | |
| (MSB) | j |
| MSCID=<ANY VALUE> | j+1 |
| (LSB) | j+2 |
| (MSB) CELL=[001H-FFFH] | j+3 |
| (LSB) SECTOR=[0H-FH](0H=OMNI) | j+4 |
| }CELL IDENTIFICATION | |
| RESERVED=[00] DOWNLINK SIGNAL STRENGTH RAW=[000000-111111] | k |
| (MSB) CDMA TARGET ONE WAY DLAY=[0000H-FFFFH](x100ns) | k+1 |
| (LSB) | k+2 |
| }DOWNLINK RADIO ENVIRONMENT | |
| SERVICE OPTION: A1 ELEMENT IDENTIFIER=[03H] | 1 |
| (MSB) SERVICE OPTION | 2 |
| =[8000H(13K SPEECH), 0011H(13K HIGH RATE VOICE SERVICE), 0003H(EVRC), 801FH(13K MARKOV), 0009H(13K LOOPBACK), 0004H(Async DATA RATE SET 1), 0005H(G3 FAX RATE SET 1), 000CH(Async DATA RATE SET 2), 000DH(G3 FAX RATE SET 2), 0006H(SMS RATE SET 1), 000EH(SMS RATE SET 2) 0021H(PACKET DATA), 0012H(OTAPA RATE SET 1), 0013H(OTAPA RATE SET 2)] (LSB) | 3 |
| --CONTINUED ON Fig.7e-- | |

FIG. 7D

| | |
|---|---|
| --CONTINUED ON Fig.7d-- | |
| CDMA SERVING ONE WAY DELAY: A1 ELEMENT IDENTIFIER=[OCH] | 1 |
| LENGTH=<VARIABLE> | 2 |
| CELL IDENTIFICATION DISCRIMINATOR=[03H,06H] | 3 |
| IF(DISCRIMINATOR=02H), CELL IDENTIFICATION {1: | |
| (MSB) CELL=[001H-FFFH] | j |
| (LSB) SECTOR=[0H-FH](0H=OMNI) | j+1 |
| }OR IF(DISCRIMINATOR=07H), CELL IDENTIFICATION {1: | |
| (MSB) | j |
| MSCID=<ANY VALUE> | j+1 |
| (LSB) | j+2 |
| (MSB) CELL=[001H-FFFH] | j+3 |
| (LSB) SECTOR=[0H-FH](0H=OMNI) | j+4 |
| }CELL IDENTIFICATION | |
| (MSB) CDMA SERVING ONE WAY DELAY=[0000H-FFFFH](x100ns) | k |
| (LSB) | k+1 |
| IS-95 MS MEASURED CHANNEL IDENTITY: A1 ELEMENT IDENTIFIER=[64H] | 1 |
| LENGTH=<VARIABLE> | 2 |
| BAND CLASS=[00000-11111] \| ARFCN(HIGH PART)=[000-111] | 3 |
| ARFCN(LOW PART)=[00H-FFH] | 4 |
| IS-2000 CHANNEL IDENTITY: A1 ELEMENT IDENTIFIER=[09H] | 1 |
| LENGTH=<VARIABLE> | 2 |
| RESERVED=[0000] \| FRAME OFFSET=[0H-FH] | 3 |
| CHANNEL INFORMATION {1+: | |
| PHYSICAL CHANNEL TYPE=[01H(FUNDAMENTAL CHANNEL-FCH-IS-2000), 02H(DEDICATED CONTROL CHANNEL-DCH-IS-2000)] | 4n |
| RESERVED=[0] \| PILOT GATING RATE=[00,01,10] \| QOF MASK=<ANY VALUE> \| WALSH CODE CHANNEL INDEX (HIGH PART)=<ANY VALUE> | 4n+1 |
| WALSH CODE CHANNEL INDEX(LOW PART)=<ANY VALUE> | 4n+2 |
| PILOT PN CODE (LOW PART)=<ANY VALUE> | 4n+3 |
| --CONTINUED ON Fig.7f-- | |

FIG. 7E

| | | | | |
|---|---|---|---|---|
| \-\-CONTINUED ON Fig.7e\-\- | | | | |
| PILOT PN CODE (HIGH PART) =[0,1] | RESERVED=[000] | Freq. INCLUDED =[1] | ARFCN(HIGH PART) =[000-111] | 6 |
| ARFCN(LOW PART)=[00H-FFH] | | | | 7 |
| } CHANNEL INFORMATION | | | | |
| QUALITY OF SERVICE PARAMETERS: A1 ELEMENT IDENTIFIER=[07H] | | | | 1 |
| LENGTH=[01H] | | | | 2 |
| RESERVED=[0000] | | PACKET PRIORITY=[0000-1101] | | 3 |
| IS-2000 MOBILE CAPABILITIES: AL ELEMENT IDENTIFIER=[11H] | | | | 1 |
| LENGTH=<VARIABLE> | | | | 2 |
| RESERVED =[00] | DCCH SUPPORTED =[0,1] | FCH SUPPORTED =[0,1] | OTD SUPPORTED =[0,1] | OTD INFO INCLUDED =[0,1] | ENHANCED RC CFG SUPPORTED =[0,1] | QPCH SUPPORTED =[0,1] | 3 |
| RESERVED =[00] | FORWARD RC PREFERRED= [0 0001(RADIO CONFIGURATION 1), 0 0010(RADIO CONFIGURATION 2), 0 0011(RADIO CONFIGURATION 3), 0 0100(RADIO CONFIGURATION 4), 0 0101(RADIO CONFIGURATION 5), 0 0110(RADIO CONFIGURATION 6), 0 0111(RADIO CONFIGURATION 7), 0 1000(RADIO CONFIGURATION 8), 1 0001(RADIO CONFIGURATION 9)] | | | FORWARD RC Pref. INCLUDED =[0,1] | 4 |
| RESERVED =[00] | REVERSE RC PREFERRED= [0 0001(RADIO CONFIGURATION 1), 0 0010(RADIO CONFIGURATION 2), 0 0011(RADIO CONFIGURATION 3), 0 0100(RADIO CONFIGURATION 4), 0 0101(RADIO CONFIGURATION 5), 0 0110(RADIO CONFIGURATION 6), | | | REVERSE RC Pref. INCLUDED =[0,1] | 5 |
| FCH INFORMATION: BIT-EXACT LENGTH-Octet COUNT =[00H TO FFH] | | | | 6 |
| RESERVED =[0000 0] | | FCH INFORMATION: BIT-EXACT LENGTH-FILL BITS =[000 TO 111] | | 7 |
| \-\-CONTINUED ON Fig.7g\-\- | | | | |

FIG. 7F

| | |
|---|---|
| --CONTINUED ON Fig.7f-- | |
| (MSB) | 8 |
| FCH INFORMATION CONTENT =\<ANY VALUE\> | ... |
| SEVENTH FILL BIT-IF NEEDED =[0(IF USED AS A FILL BIT)] \| SIXTH FILL BIT-IF NEEDED =[0(IF USED AS A FILL BIT)] \| FIFTH FILL BIT-IF NEEDED =[0(IF USED AS A FILL BIT)] \| FOURTH FILL BIT-IF NEEDED =[0(IF USED AS A FILL BIT)] \| THIRD FILL BIT-IF NEEDED =[0(IF USED AS A FILL BIT)] \| SECOND FILL BIT-IF NEEDED =[0(IF USED AS A FILL BIT)] \| FIRST FILL BIT-IF NEEDED =[0(IF USED AS A FILL BIT)] | k |
| DCCH INFORMATION:BIT-EXACT LENGTH-Octet COUNT =[00H TO FFH] | k+1 |
| RESERVED=[0000 0] \| DCCH INFORMATION BIT-EXACT LENGTH-FILL BITS=[000 TO 111] | k+2 |
| (MSB) | k+3 |
| DCCH INFORMATION CONTENT =\<ANY VALUE\> | ... |
| SEVENTH FILL BIT-IF NEEDED =[0(IF USED AS A FILL BIT)] \| SIXTH FILL BIT-IF NEEDED =[0(IF USED AS A FILL BIT)] \| FIFTH FILL BIT-IF NEEDED =[0(IF USED AS A FILL BIT)] \| FOURTH FILL BIT-IF NEEDED =[0(IF USED AS A FILL BIT)] \| THIRD FILL BIT-IF NEEDED =[0(IF USED AS A FILL BIT)] \| SECOND FILL BIT-IF NEEDED =[0(IF USED AS A FILL BIT)] \| FIRST FILL BIT-IF NEEDED =[0(IF USED AS A FILL BIT)] | m |
| IS-2000 SERVICE CONFIGURATION RECORD:A1 ELEMENT IDENTIFIER=[0EH] | 1 |
| BIT-EXACT LENGTH-Octet COUNT=\<VARIABLE\> | 2 |
| RESERVED=[0000 0] \| BIT-EXACT LENGTH-FILL BITS=[000 - 111] | 3 |
| (MSB) | 4 |
| IS-2000 SERVICE CONFIGURATION RECORD CONTENT=\<ANY VALUE\> | ... |
| SEVENTH FILL BIT-IF NEEDED =[0(IF USED AS A FILL BIT)] \| SIXTH FILL BIT-IF NEEDED =[0(IF USED AS A FILL BIT)] \| FIFTH FILL BIT-IF NEEDED =[0(IF USED AS A FILL BIT)] \| FOURTH FILL BIT-IF NEEDED =[0(IF USED AS A FILL BIT)] \| THIRD FILL BIT-IF NEEDED =[0(IF USED AS A FILL BIT)] \| SECOND FILL BIT-IF NEEDED =[0(IF USED AS A FILL BIT)] \| FIRST FILL BIT-IF NEEDED =[0(IF USED AS A FILL BIT)] | k |
| --CONTINUED ON Fig.7h-- | |

FIG. 7G

| --CONTINUED ON Fig.7g-- | |
|---|---|
| PDSN IP ADDRESS: A1 ELEMENT IDENTIFIER=[14H] | 1 |
| LENGTH=[04H] | 2 |
| (MSB) | 3 |
| PDSN IP ADDRESS=<ANY VALUE> | 4 |
|  | 5 |
| (LSB) | 6 |
| PROTOCOL TYPE: A1 ELEMENT IDENTIFIER=[18H] | 1 |
| LENGTH=[02H] | 2 |
| (MSB) PROTOCOL TYPE=[88 0BH](PPP) | 3 |
| (LSB) | 4 |
| PACKET ZONE ID: A1 ELEMENT IDENTIFIER=[xxH] | 1 |
| (MSB) PACKET ZONE ID (LSB) | 2 |
| SERVICE OPTION CONNECTION REFERENCE: A1 ELEMENT IDENTIFIER=[xxH] | 1 |
| LENGTH=[013H] | 2 |
| RESERVED=[000000]　　SOC_NUM=1 | 3 |
| (MSB) SERVICE OPTION 1 | 4 |
| =[8000H (13K SPEECH), 0011H (13K HIGH RATE VOICE SERVICE), 0003H (EVRC), 801FH (13K MARKOV), 0009H (13K LOOPBACK), 0004H (Async DATA RATE SET 1), 0005H (G3 FAX RATE SET 1), 000CH (Async DATA RATE SET 2), 000DH (G3 FAX RATE SET 2), 0006H (SMS RATE SET 1), 000EH (SMS RATE SET 2), 0021H (PACKET DATA), 0012H (OTAPA RATE SET 1), 0013H (OTAPA RATE SET 2)]　(LSB) | 5 |
| (MSB) | 6 |
| SERVICE OPTION 1 CONNECTION REFERENCE=<ANY VALUE> | 7 |
|  | 8 |
| (LSB) | 9 |
| --CONTINUED ON Fig.7i-- | |

FIG. 7H

| | | |
|---|---|---|
| --CONTINUED ON Fig.7h-- | | |
| (MSB) SERVICE OPTION 2 | (LSB) | 10 |
| =[8000H (13K SPEECH),<br>0011H (13K HIGH RATE VOICE SERVICE),<br>0003H (EVRC),<br>801FH (13K MARKOV),<br>0009H (13K LOOPBACK),<br>0004H (Async DATA RATE SET 1),<br>0005H (G3 FAX RATE SET 1),<br>000CH (Async DATA RATE SET 2),<br>000DH (G3 FAX RATE SET 2),<br>0006H (SMS RATE SET 1),<br>000EH (SMS RATE SET 2),<br>0021H (PACKET DATA),<br>0012H (OTAPA RATE SET 1),<br>0013H (OTAPA RATE SET 2)] | | 11 |
| (MSB) | | 12 |
| SERVICE OPTION 2 CONNECTION REFERENCE=<ANY VALUE> | | 13 |
| | | 14 |
| | (MSB) | 15 |

FIG. 7I

| INFORMATION ELEMENT |
|---|
| MESSAGE TYPE |
| CHANNEL TYPE |
| ENCRYPTION INFORMATION |
| CLASSMARK INFORMATION TYPE2 |
| CELL IDENTIFIER LIST(TARGET) |
| CIRCUIT IDENTIFIER CODE EXTENSION |
| IS-95 CHANNEL IDENTITY |
| MOBILE IDENTITY(IMSI) |
| MOBILE IDENTITY(ESN) |
| DOWNLINK RADIO ENVIRONMENT |
| SERVICE OPTION |
| CDMA SERVING ONE WAY DELAY |
| IS-95 MS MEASURED CHANNEL IDENTITY |
| IS-2000 CHANNEL IDENTITY |
| QUALITY OF SERVICE PARAMETERS |
| IS-2000 MOBILE CAPABILITIES |
| IS-2000 SERVICE CONFIGURATION RECORD |
| PDSN IP ADDRESS |
| PROTOCOL TYPE |
| PACKET ZONE ID |
| SERVICE OPTION CONNECTION REFERENCE |

FIG. 10

METHOD FOR PROVIDING CONCURRENT SERVICE HANDOFF IN A MOBILE COMMUNICATION SYSTEM

PRIORITY

This application claims priority to an application entitled "Apparatus and Method for Providing Concurrent Service Handoff in a Mobile Communication System" filed in the Korean Industrial Property Office on Apr. 12, 2000 and assigned Ser. No. 2000-20168; and an application entitled "Apparatus and Method for Providing Concurrent Service Handoff in a Mobile Communication System" filed in the Korean Industrial Property Office on May 16, 2000 and assigned Ser. No. 2000-27159, the contents of both of which are hereby incorporated by reference.

BACKGROUND OF THE INVENTION

1. Field of the Invention

The present invention relates generally to a handoff method in a mobile communication system, and in particular, to a handoff method in a mobile communication system supporting a concurrent service.

2. Description of the Related Art

In general, a CDMA (Code Division Multiple Access) mobile communication system cannot concurrently provide two difference services in an active state. That is, an existing mobile communication system provides only one of a voice service and a packet service, and rejects a newly requested service, which is different from the currently provided service.

FIG. 1 illustrates the structure of a common mobile communication system. More specifically, FIG. 1 illustrates a reference model of a 3G IOS ($3^{rd}$ Generation Interoperability Specifications) for a digital air interface between a mobile switching center (MSC) and a base station (BS), and between one base station and another base station.

Referring to FIG. 1, the mobile communication system includes a mobile switching center (MSC) 10, base stations (BS) 30 and 40, and a packet data service node or network (PDSN) 60. An interworking function (IWF) block 20 is connected to the mobile switching center 10, and a packet control function (PCF) block 50 is interconnected between the base station 30 and the PDSN 60. The mobile switching center 10 includes a call control and mobility management block 12 and a switch function block 14. The base station 30 is a source base station and the base station 40 is a target base station. The base stations 30 and 40 include base station controllers (BSCs) 32 and 42, and base station transceiver subsystem (BTSs) 34 and 44, respectively. The base station controller 32 includes an SDU (Service Data Unit) function block. The base station transceiver subsystems 34 and 44 are wirelessly connected to the mobile stations (not shown). Assuming that the mobile stations are connected to the mobile switching center 10 via the base station 30 to be provided with the voice service and connected to the PDSN 60 via the base station 30 to be provided with the packet service, a handoff occurs even when the mobile station moves to a service area of the base station 40 adjacent to the base station 30, in order to maintain the currently provided service. That is, during a handoff, the base station 30 serves as a source base station and the base station 40 serves as a target base station.

Signaling data between the mobile switching center 10 and the base station controller 32 is defined as an A1 interface, and user data (or traffic) therebetween is defined as A2/A5 (circuit data only) interfaces. An A3 interface is for a soft/softer handoff between the base stations, and is used for an exchange of signaling data and user traffic between frame selection functions of the target base station 40 and the source base station 30. An A7 interface is also for the soft/softer handoff between the base stations, and is used for an exchange of the signaling data between the target base station 40 and the source base station 30. A8/A9 interfaces are used for exchanges of user traffic and signaling data between the base station 30 and the PCF block 50, respectively. A10 and A11 interfaces are used for exchanges of user traffic and signaling data between the PCF block 50 and the PDSN 60, respectively.

In the CDMA system of FIG. 1, wired communication links between the base stations 30 and 40, and between the base station 30 and the mobile switching center 10 include a forward link for transmitting signals from the mobile switching center 10 to the base station 30, a reverse link for transmitting signals from the base station 30 to the mobile switching center 10, and a link between the base station 30 and the base station 40. A mobile station (not shown) interacting or connected to the base station transceiver subsystem 34 in the source base station 30 is connected to the mobile switching center 10 via the source base station 30 to be provided with the voice service, and connected to the PDSN 60 via the source base station 30 to be provided with the packet service.

It is assumed herein that the mobile station connected to the source base station 30 is provided with any one of the voice service and the packet service. A handoff process is performed when the mobile station moves from a service area of the source base station 30 to a service area of the target base station 40. Conventionally, the source base station 30 and the target base station 40 perform a handoff in accordance with the flows shown in FIGS. 2 and 3.

FIG. 2 illustrates a handoff process flow in the conventional CDMA communication system.

Referring to FIG. 2, when signal strength reported from a mobile station MS exceeds predefined signal strength, a source base station recommends one or more cells belonging to a target base station to perform a handoff by sending a handoff required message together with a list of the corresponding cells to the mobile station center MSC, in step 20a. At this moment, a handoff bit in the handoff required message is set to '1' indicating the handoff. Further, the source base station activates a timer T7.

In step 20b, since the handoff bit in the handoff required message received from the source base station is set to '1' indicating the handoff, the mobile switching center sends a handoff request message to a target base station. The handoff request message includes TIA/EIA-95 channel identity element. In particular, in the case of a handoff for an asynchronous data or facsimile service, the mobile switching center sends the handoff request message with a CIC (Circuit Identity Code) extension information element indicating a CIC code between SDU (Selection and Distribution Unit) and IWF (InterWorking Function).

In step 20c, upon receipt of the handoff request message from the mobile switching center, the target base station assigns a proper radio resource specified in the handoff request message and connects a call. In addition, the target base station sends a null forward traffic channel frame to the mobile station.

In step 20d, the target base station sends a handoff request acknowledge message to the mobile switching center. Further, the target base station activates a timer T9. The timer T9 remains activated until the mobile station is connected to the assigned radio channel.

In step 20*e*, in reply to the handoff request acknowledge message from the target base station, the mobile switching center prepares to switch the mobile station from the source base station to the target base station, and sends a handoff command message to the source base station. In response to the handoff command message, the source base station inactivates the timer T7.

In step 20*f*, in response to the handoff command message, the source base station sends a handoff direction message to the mobile station. For the handoff direction message, any one of general handoff direction message, extended handoff direction message and universal handoff direction message can be used. In addition, the source base station activates a timer T8. The source base station also activates a timer Twaitho, if the mobile station is permitted to return to the source base station.

In step 20*g*, the mobile station sends an MS Ack order message to the source base station in acknowledgement of the handoff direction message. At this point, the source base station inactivates the timer T8. If the handoff direction message is repeatedly sent at a high rate, the source base station may not require acknowledgement from the mobile station. In this case, the source base station does not activate the timer T8 in step 20*f*.

In step 20*h*, the source base station sends a handoff commenced message to the mobile switching center in order to inform that the mobile station is ready to move to the target base station channel. In addition, the source base station activates the timer T306 until a clear command message is received from the mobile switching center. If the timer Twaitho has been activated, the source base station waits to inactivate the timer Twaitho before transmission of the handoff commenced message.

In step 20*i*, the mobile station sends a reverse traffic channel frame or a traffic channel preamble to the target base station.

In step 20*j*, the mobile station sends a handoff completion message to the target base station.

In step 20*k*, the target base station wirelessly sends a BS Ack order message to the mobile station.

In step 20*l*, the target base station sends to the mobile switching center a handoff complete message indicating a successful handoff of the mobile station. In addition, the target base station inactivates the timer T9.

In step 20*m*, the mobile switching center sends a clear command message to the source base station. Further, the mobile switching center activates a timer T315. In particular, in the case of a handoff for an asynchronous data or facsimile service, the mobile switching center sends a clear command message for clearing every resource including A5 connection in the previous base station. In reply to the clear command message, the source base station inactivates the timer T306.

In step 20*n*, the source base station sends to the mobile switching center a clear complete message indicating a successful clear. In response to the clear complete message, the mobile switching center inactivates the timer T315.

FIG. 3 illustrates a procedure for creating and transmitting a handoff required message in the source base station during a handoff according to the prior art.

Referring to FIG. 3, in step 10, the source base station receives a pilot signal strength measurement message (PSMM) from the mobile station MS and determines whether to perform a handoff, depending on the received PSMM message. If determined to perform a handoff, the source base station creates a handoff required message in step 11. The created handoff required message includes a single service option and an IS-2000 Service Configuration Record (SCR) related to this service. For example, the handoff required message includes an IS-2000 Service Configuration Record related to the voice service, or includes an IS-2000 Service Configuration Record related to the packet service. In step 12, the source base station sends the created handoff required message to the mobile switching center (MSC).

FIG. 4 illustrates a procedure for receiving in the target base station a handoff request message from the mobile switching center and processing the received handoff request message during a handoff according to a prior art.

Referring to FIG. 4, in step 21, the target base station checks the service option and the IS-2000 Service Configuration Record, specified in the handoff request message received from the mobile switching center MSC. In step 22, the target base station determines whether it is possible to accept a handoff. If it is possible to accept a handoff in step 22, the target base station determines in step 23 whether it is possible to assign the same radio resource as that specified in the handoff request message to the corresponding BTS with regard to one service required by the MSC. If it is not possible to assign the same resource in step 23, the target base station determines in step 24 whether it is possible to assign a radio resource by allowing a change in the Service Configuration Record (SCR). If it is not possible to assign a radio resource by allowing a change in the Service Configuration Record in step 24, the target base station creates a handoff failure message with a Cause value indicating non-assignability of the corresponding radio resource, and then sends the created handoff failure message to the mobile switching center MSC in step 25.

If it is possible to assign a radio resource by allowing a change in the Service Configuration Record in step 24, the target base station creates a handoff request Ack message with a changed IS-2000 Service Configuration Record added thereto, and sends the created handoff request Ack message to the MSC, in step 25-1.

If it is possible to assign the same radio resource in step 23, it means that it is possible to assign the same radio resource as that specified in the IS-2000 Service Configuration Record required by the MSC. Thus, in step 25-2, the target base station creates a handoff request Ack message with the IS-2000 Service Configuration Record removed, and then sends the created handoff request Ack message to the MSC.

If it is not possible to accept the handoff in step 22, the target base station creates a handoff failure message with a Cause value indicating unacceptability of the handoff, and then sends the created handoff failure message to the MSC, in step 25-3.

As described above, the conventional handoff process considers only the case where the mobile communication system provides a single service (not concurrent service). That is, since the conventional mobile communication system provides any one of the voice service and the packet service, it never considers the handoff process performed in a state where the voice and packets services are concurrently provided, i.e., a state where the concurrent service is provided.

Therefore, for the future mobile communication system supporting the concurrent service, it is necessary to consider a plan to perform a concurrent handoff on the two services. If it is not possible to perform a concurrent handoff on the two services, it is necessary to consider a plan to perform a handoff on at least one of the two services.

SUMMARY OF THE INVENTION

It is, therefore, an object of the present invention to provide a method for performing a concurrent handoff on two services in a mobile communication system concurrently providing the two services.

It is another object of the present invention to provide a method for performing a handoff on at least one of two services in a mobile communication system concurrently providing the two services.

To achieve the above and other objects, there is provided a method for performing a handoff on voice and packet data according to movement of a mobile station from a first base station to a second base station in a mobile communication system including the first base station communicating the voice and packet data with the mobile station, a mobile switching center connected to the first base station, and the second base station adjacent to the first base station. The first base station sends a handoff required message to the mobile switching center according to the movement of the mobile station to the second base station. The handoff required message includes a service type identifier indicating a concurrent service of the voice and packet data and a service configuration record. The mobile switching center sends the service type identifier and the service configuration record in the received handoff required message to the second base station. The second base station determines whether it is possible to communicate with the mobile station using a radio resource specified in the service type identifier and the service configuration record, and sends, when it is not possible to communicate with the mobile station, to the mobile switching center a new service type identifier and a new service configuration record indicating that it is possible to communicate one of the voice and packet data with the mobile station. The mobile switching center sends the new service type identifier and the new service configuration record to the first base station, and then the first base station sends the new service type identifier and the new service configuration record to the mobile station. The mobile station then forms a communication link to the second base station according to the new service type identifier and the new service configuration record.

Preferably, the service configuration record is resource information including a radio channel or a data rate.

BRIEF DESCRIPTION OF THE DRAWINGS

The above and other objects, features and advantages of the present invention will become more apparent from the following detailed description when taken in conjunction with the accompanying drawings in which:

FIG. 6 is a diagram illustrating a format of the handoff required message for the concurrent service according to an embodiment of the present invention;

FIGS. 7A to 7I are diagrams illustrating bit map layouts of the handoff required message for the concurrent service according to an embodiment of the present invention;

FIG. 10 is a diagram illustrating a format of the handoff request message for the concurrent service according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
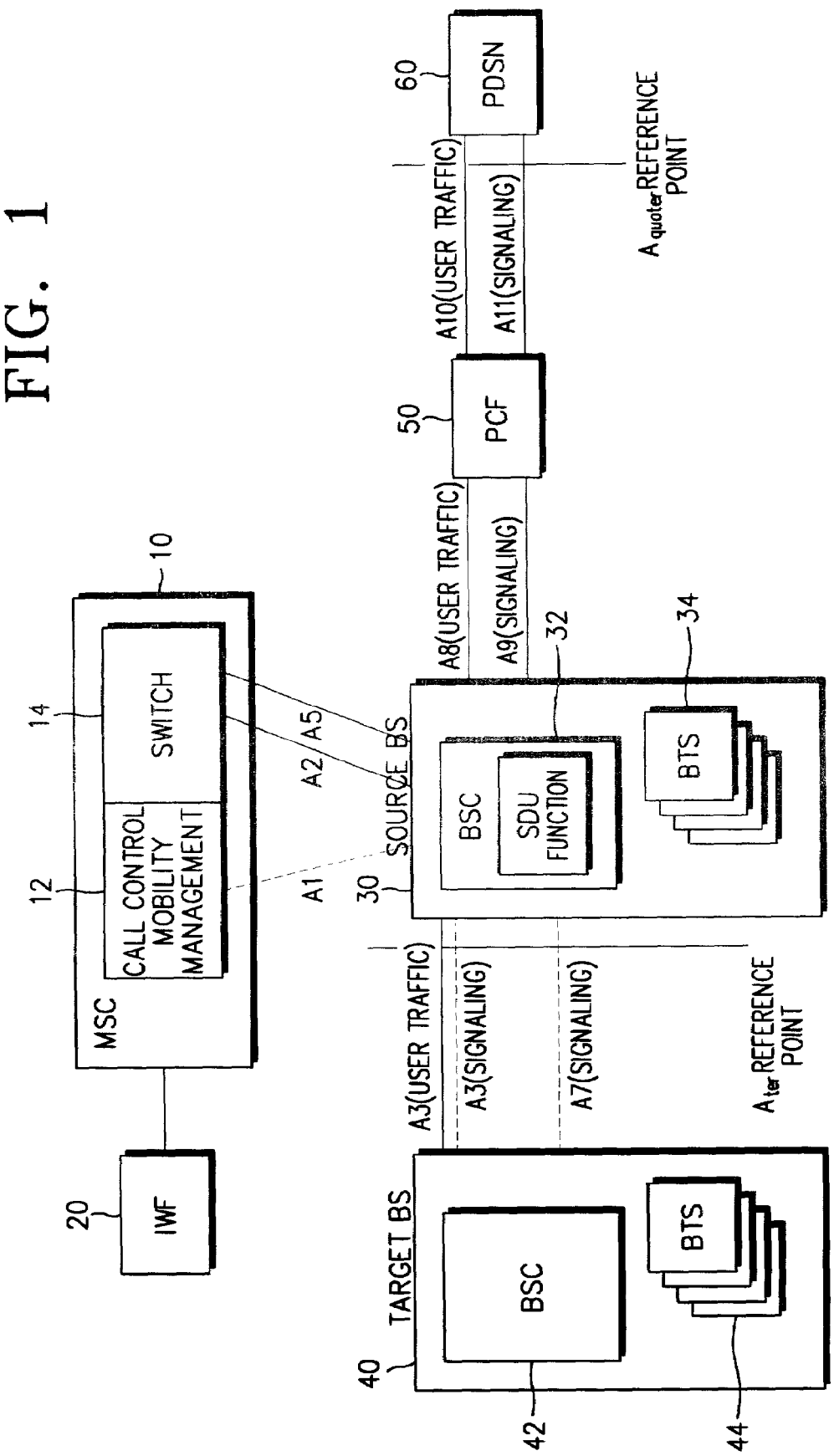
FIG. 1 is a diagram illustrating a structure of a common CDMA communication system.
Figure 2:
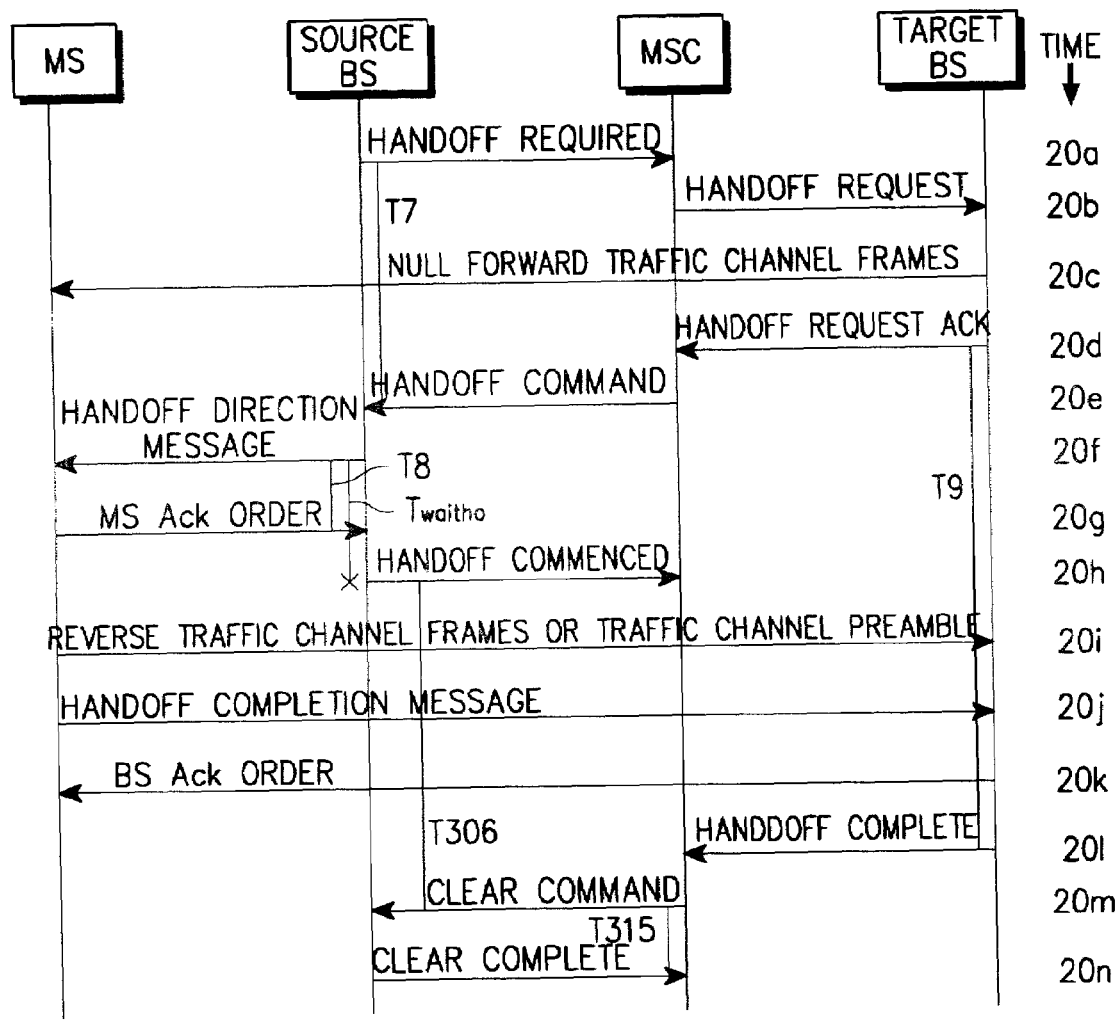
FIG. 2 is a flow diagram illustrating a conventional handoff process in the CDMA communication system.
Figure 3:
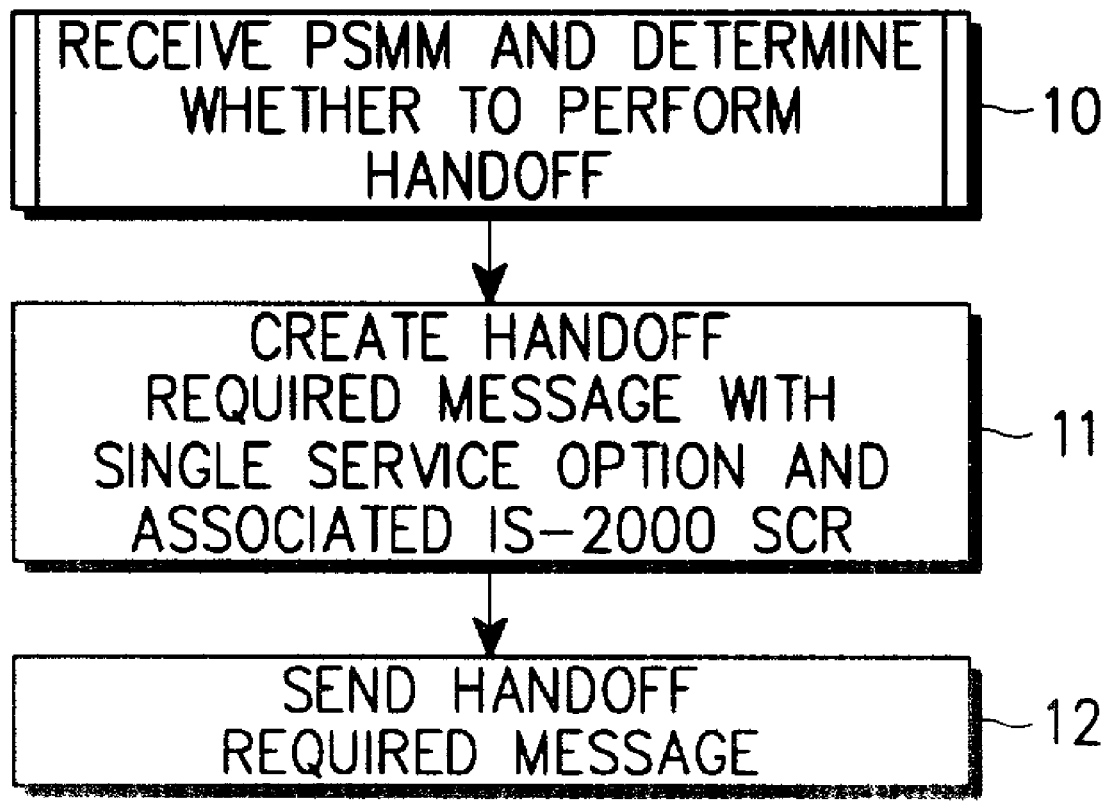
FIG. 3 is a flow chart illustrating a procedure for creating a handoff required message in a source base station during the conventional handoff process.
Figure 4:
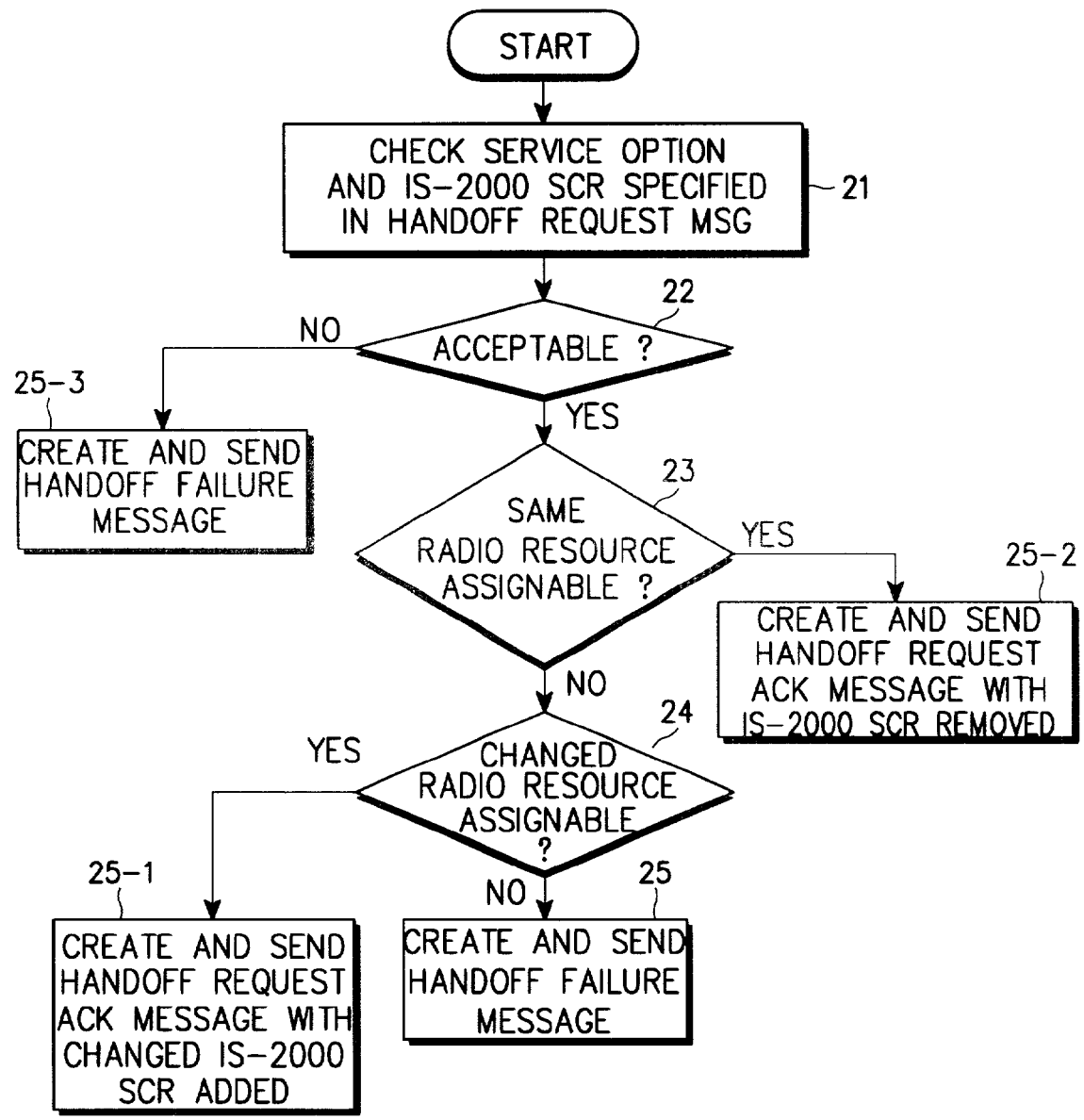
FIG. 4 is a flow chart illustrating a procedure for processing a handoff request message received from a MSC in a target base station during the conventional handoff process.

The present invention relates to a method for performing a handoff between a first base station (source base station) and a second base station (target base station) in the mobile communication system shown in FIG. 1. More specifically, even when a mobile station concurrently provided with a first service (voice service) and a second service (packet service) through the first base station moves to the second base station adjacent to the first base station, the mobile station is seamlessly provided with the first and second services. That is, the present invention provides a method for performing a handoff on voice and packet data due to the movement of the mobile station to the second base station while the mobile station communicates the voice and packet data with the first base station. Strictly speaking, although the present invention relates to an inter-BSC handoff between BSC of the source base station and BSC of the target base station, it will be referred to as "inter-base station handoff" for convenience.

In the following description, the term "forward link" as used herein refers to a link transmitted from the base station to the mobile station and a link transmitted from the mobile switching center to the base station, and the term "reverse link" refers to a link transmitted from the mobile station to the base station and a link transmitted from the base station to the mobile switching center.

Figure 5:
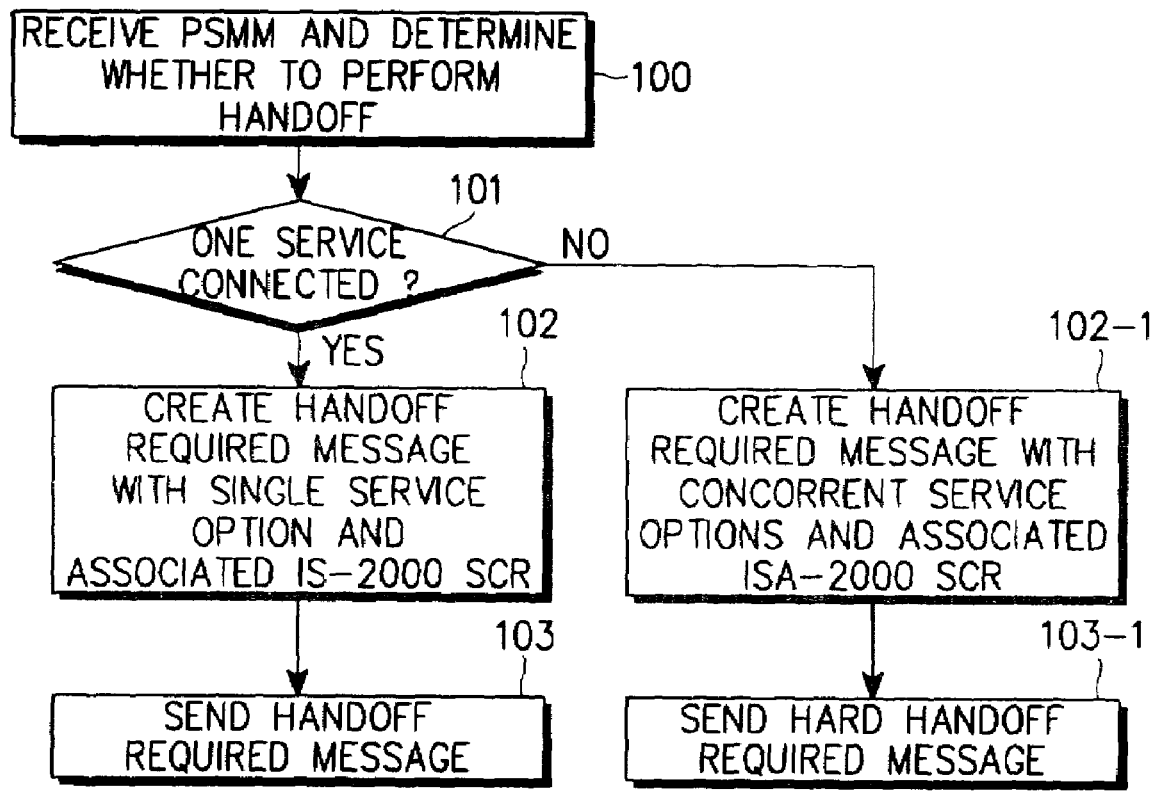
FIG. 5 is a flow chart illustrating a procedure for creating a handoff required message for the concurrent service in the source base station during a handoff according to an embodiment of the present invention.

FIG. 5 illustrates a procedure for creating a handoff required message for the concurrent service in the source base station during a handoff according to an embodiment of the present invention. The source base station sends the created handoff required message for the concurrent service to the mobile switching center.

Referring to FIG. 5, in step 100, the source base station receives a pilot signal strength measurement message (PSMM) from the mobile station MS and then determines whether to perform a handoff, depending upon the received PSMM. When determined to perform a handoff, the source base station determines in step 101 whether the number of currently connected services is one.

If the number of the currently connected services is one, the source base station creates in step 102 a handoff required message in which a currently connected single service option and an IS-2000 Service Configuration Record related to this service are included. For example, in the handoff required message is included an IS-2000 Service Configuration Record related to the voice service or an IS-2000 Service Configuration Record related to the packet service. In step 103, the source base station sends the created handoff required message to the mobile switching center.

Otherwise, if the number of the currently connected services is not one but two, the source base station creates in step 102-1 a handoff required message in which options of the two currently connected services and an IS-2000 Service Configuration Record related to these services are included. In step 103-1, the source base station sends the created handoff required message to the mobile switching center.

FIG. 6 illustrates a format of the handoff required message for the concurrent service according to an embodiment of the present invention. Such a handoff required message for the concurrent service is created in the source base station and then transmitted to the mobile switching center as described with reference to FIG. 5.

Referring to FIG. 6, the handoff required message for the concurrent service according to an embodiment of the present invention includes an information element for Message Type. Further, the handoff required message includes information elements for Cause, Cell Identifier List (Target), Classmark Information Type 2, Response Request, Encryption Information, IS-95 Channel Identity, Mobile Identity (ESN), and Downlink Radio Environment. In addition, the handoff required message includes information elements for Service Option, CDMA Serving One Way Delay, IS-95 MS Measured Channel Identity, IS-2000 Channel Identity, and Quality of Service Parameters. In addition, the handoff required message includes information elements for IS-2000 Mobile Capabilities, IS-2000 Service Configuration Record, PDSN IP Address, Protocol Type, Packet Zone ID, and Service Option Connection Reference.

Among the information elements of the handoff required message for the concurrent service, Service Option Connection Reference and IS-2000 Service Configuration Record (SCR) are the characteristic information elements according to an embodiment of the present invention. The information elements for the conventional handoff required message include Service Option for a single service and IS-2000 Service Configuration Record. That is, the prior art Service Option is associated with a single service provided in the mobile communication system, and the IS-2000 Service Configuration Record is also associated with the single service.

Unlike this, the Service Option Connection Reference included in the handoff required message for the concurrent service according to an embodiment of the present invention is information indicating the types of services currently provided in the mobile communication system, and IS-2000 Service Configuration Record is information indicating radio resources assigned for the provided services. For example, assuming that the mobile communication system concurrently provides the voice service and the packet service, the Service Option Connection Reference field is filled with an option for the voice service and an option for the packet service, while the IS-2000 Service Configuration Record field is filled with radio resource information such as a channel assigned to the base station (more specifically, BTS) and a data rate, so that the mobile station can be concurrently provided with the voice service and the packet service.

FIGS. 7A to 7I illustrate bit map layouts of the handoff required message for the concurrent service, shown in FIG. 6, according to an embodiment of the present invention.

The handoff required message of FIG. 7A includes information elements for BSMAP Header, Message Type, Cause, Cell Identifier List (Target), and a part of Classmark Information Type 2.

The handoff required message of FIG. 7B, continued from FIG. 7A, includes information elements for the other part of Classmark Information Type 2, Response Request, and a part of Encryption Information.

The handoff required message of FIG. 7C, continued from FIG. 7B, includes information elements for the other part of Encryption Information, IS-95 Channel Identity, and Mobile Identity (ESN).

The handoff required message of FIG. 7D, continued from FIG. 7C, includes information elements for Downlink Radio Environment, and Service Option.

The handoff required message of FIG. 7E, continued from FIG. 7D, includes information elements for CDMA Serving One Way Delay, IS-95 MS Measured Channel Identity, and a part of IS-2000 Channel Identity.

The handoff required message of FIG. 7F, continued from FIG. 7E, includes information elements for the other part of IS-2000 Channel Identity, Quality of Service Parameters, and a part of IS-2000 Mobile Capabilities.

The handoff required message of FIG. 7G, continued from FIG. 7G, includes information elements for the other part of IS-2000 Mobile Capabilities, and IS-2000 Service Configuration Record.

The handoff required message of FIG. 7H, continued from FIG. 7G, includes information elements for PDSN IP Address, Protocol Type, Packet Zone ID, and a part of Service Option Connection Reference.

The handoff required message of FIG. 7I, continued from FIG. 7H, includes information elements for the remaining parts of Service Option Connection Reference.

As shown in FIGS. 7H and 7I, the handoff required message according to the present invention includes the Service Option Connection Reference field which is an identifier indicating the service types provided during the concurrent service. The Service Option Connection Reference field is comprised of a first service option field indicating the type of the first service (e.g., voice service), a first service option connection reference field, a second service option field indicating the type of the second service (e.g., packet data service), and a second service option connection reference field. For example, in each service option field can be stored an identifier indicating 14 service types. More specifically, the Service Option Connection Reference field is a service type identifier indicating such services as 13K speech, 13K high rate voice service, EVRC (Enhanced Variable Rate Codec), 13K Markov, 13K Loopback, Async Data Rate Set 1, G3 Fax Rate Set 1, Async Data Rate Set 2, G3 Fax Rate Set 2, SMS (Short Message Service) Rate Set 1, SMS Rate Set 2, Packet Data, OTAPA (Over-The-Air Parameter Administration) Rate Set 1, and OTAPA Rate Set 2.

Figure 8:
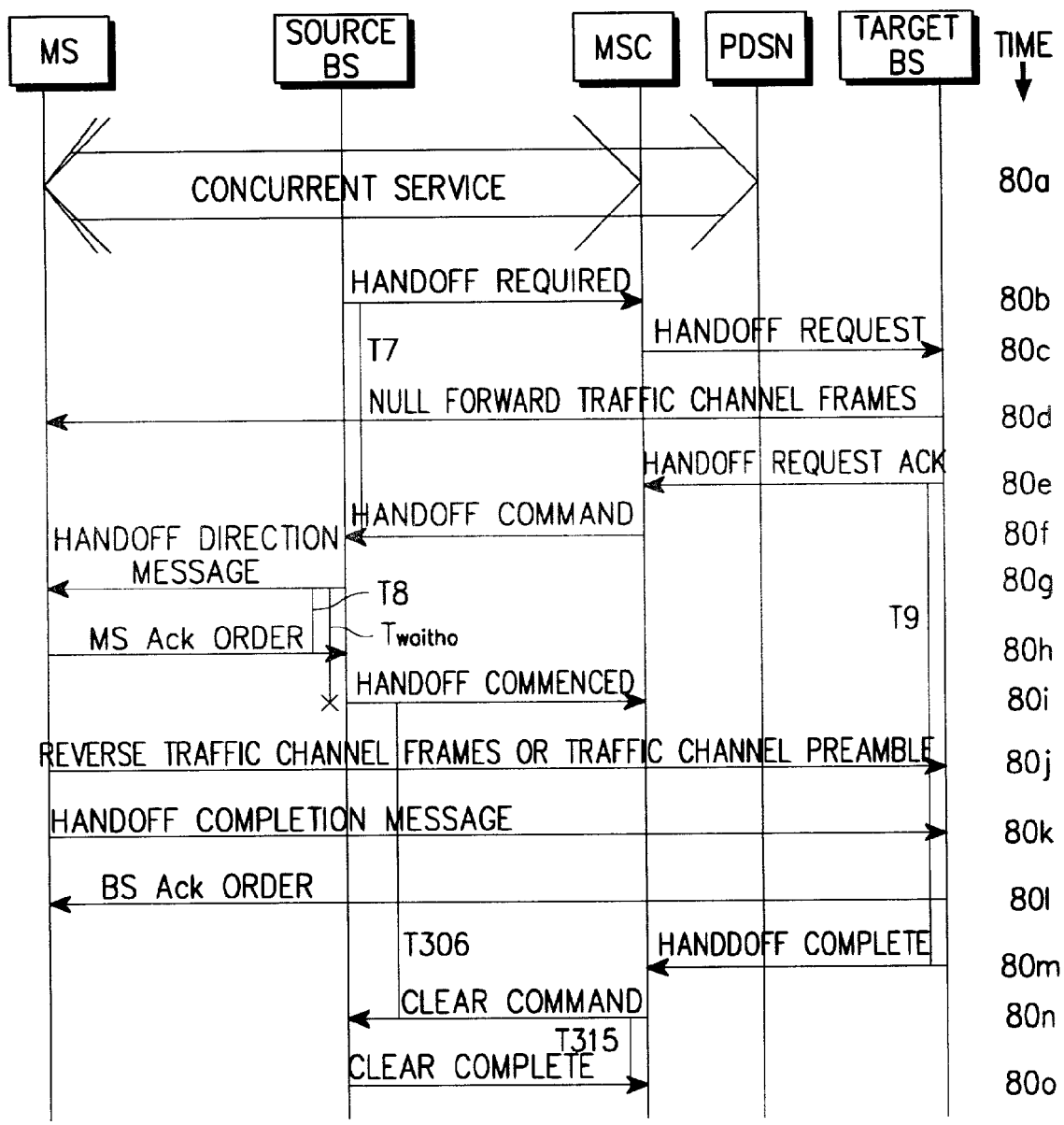
FIG. 8 is a flow diagram illustrating a handoff process for the concurrent service in a CDMA communication system according to an embodiment of the present invention.

FIG. 8 illustrates a handoff process for the concurrent service in the CDMA communication system according to an embodiment of the present invention.

Referring to FIG. 8, in step 80a, the source base station provides the voice service between the mobile station MS and the mobile switching center MSC and provides the packet service between the mobile station MS and the PDSN. That is, in step 80*a*, the mobile station communicates voice and packet data with the source base station, being concurrently provided with the two services: the voice service and the packet service. Here, it will be assumed that signal strength at a target base station reported from the mobile station exceeds a predetermined signal strength. The source base station can determine the signal strength reported from the mobile station by receiving PSMM from the mobile station.

Assuming that the signal strength reported from the mobile station exceeds the predetermined signal strength, the source base station recommends in step 80*b* one or more cells belonging to a target base station to perform a handoff by creating a concurrent service handoff required message, shown in FIG. 6, with a list of the corresponding cells, and sending the created handoff required message to the MSC. Here, the handoff required message for the concurrent service includes the Service Option Connection Reference having two service options indicating the currently provided two services and connection references associated with the service options, and the IS-2000 Service Configuration Record related to the respective service options. In addition, the handoff required message for the concurrent service includes Packet Zone Identifier, to the packet zone the source base station belonging. Further, the source base station activates a timer T7.

In step 80*c*, since the handoff required message received from the source base station indicates the handoff, the mobile switching center creates a handoff request message and sends the created handoff request message to the target base station. The handoff request message includes TIA/EIA-95 Channel Identity element supporting two services. Similarly to the handoff required message, the handoff request message includes the Packet Zone Identifier to which the source base station belongs, and also includes the Service Option Connection Reference having the currently provided two service options and connection references associated with the service options. However, since the connection references are limited to the source base station, the mobile switching center sets the connection references before transmission such that the target base station can ignore them.

In step 80*d*, upon receipt of the handoff request message from the mobile switching center, the target base station assigns radio resources proper for the two services specified in the received handoff request message and connects a call. The two services are specified in the Service Option Connection Reference of the handoff request message, as described above. When there is a radio resource available for only one of the two services, the target base station assigns a radio resource proper for the one connectable service by consulting the IS-2000 Service Configuration Record and connects a call. Thereafter, the target base station sends one or two null forward traffic channel frames to the mobile station. Here, the forward traffic channel may be a fundamental channel (FCH) or a dedicated control channel (DCCH).

In step 80*e*, the target base station creates a handoff request acknowledge message and sends the created handoff request acknowledge message to the mobile switching center, in acknowledgement of the handoff request message. At this point, the target base station compares the Packet Zone Identifier for the source base station, received from the mobile switching center, with its own Packet Zone Identifier, and inserts, when they are not identical to each other, its own Packet Zone Identifier into the handoff request Ack message.

In addition, the target base station inserts into the handoff request Ack message a new IS-2000 Service Configuration Record related to the two services or one connectable service, and the Service Option Connection Reference of the target base station, having two service option numbers related to the concurrent service between the target base station and the mobile switching center and their associated connection references. Further, the target base station activates a timer T9. The timer T9 remains activated until the mobile station is connected to the assigned radio channel.

In step 80*f*, in response to the handoff request Ack message from the target base station, the mobile switching center prepares to switch the mobile station from the source base station to the target base station, and sends a handoff command message to the source base station. Here, the handoff command message includes the IS-2000 Service Configuration Record included in the message transmitted from the target base station, and the Packet Zone identifier. In response to the handoff command message, the source base station inactivates the timer T7.

In step 80*g*, in response to the handoff command message, the source base station sends a handoff direction message to the mobile station, the handoff direction message including the Service Configuration Record included in the handoff command message received from the mobile switching center and the Packet Zone Identifier. For the handoff direction message, any one of general handoff direction message, extended handoff direction message and universal handoff direction message can be used. In addition, the source base station activates a timer T8. The source base station also activates a timer Twaitho, if the mobile station is permitted to return to the source base station.

In step 80*h*, the mobile station sends an MS Ack order message to the source base station in acknowledgement of the handoff direction message. At this point, the source base station inactivates the timer T8. If the handoff direction message is repeatedly sent at a high rate, the source base station may not require acknowledgement from the mobile station. In this case, the source base station does not activate the timer T8 in step 80*g*.

In step 80*i*, the source base station sends a handoff commenced message to the mobile switching center in order to inform that the mobile station is ready to move to the target base station channel. In addition, the source base station continues to activate a timer T306 until a clear command message is received from the mobile switching center. If the timer Twaitho has been activated, the source base station waits to inactivate the timer Twaitho before transmission of the handoff commenced message.

In step 80*j*, the mobile station sends a reverse traffic channel frame or a traffic channel preamble to the target base station.

In step 80*k*, the mobile station sends a handoff completion message to the target base station.

In step 80*l*, the target base station wirelessly sends a BS Ack order message to the mobile station, in reply to the handoff completion message.

In step 80*m*, the target base station sends to the mobile switching center a handoff complete message indicating a successful handoff of the mobile station. In addition, the target base station inactivates the timer T9.

In step 80*n*, the mobile switching center sends a clear command message to the source base station. Further, the mobile switching center activates a timer T315. In particular, in the case of a handoff for an asynchronous data or facsimile service, the mobile switching center sends a clear command message for clearing every resource including A5 connection in the previous base station. In reply to the clear command message, the source base station inactivates the timer T306.

In step 80o, the source base station sends to the mobile switching center a clear complete message indicating a successful clear. In response to the clear complete message, the mobile switching center inactivates the timer T315.

Figure 9:
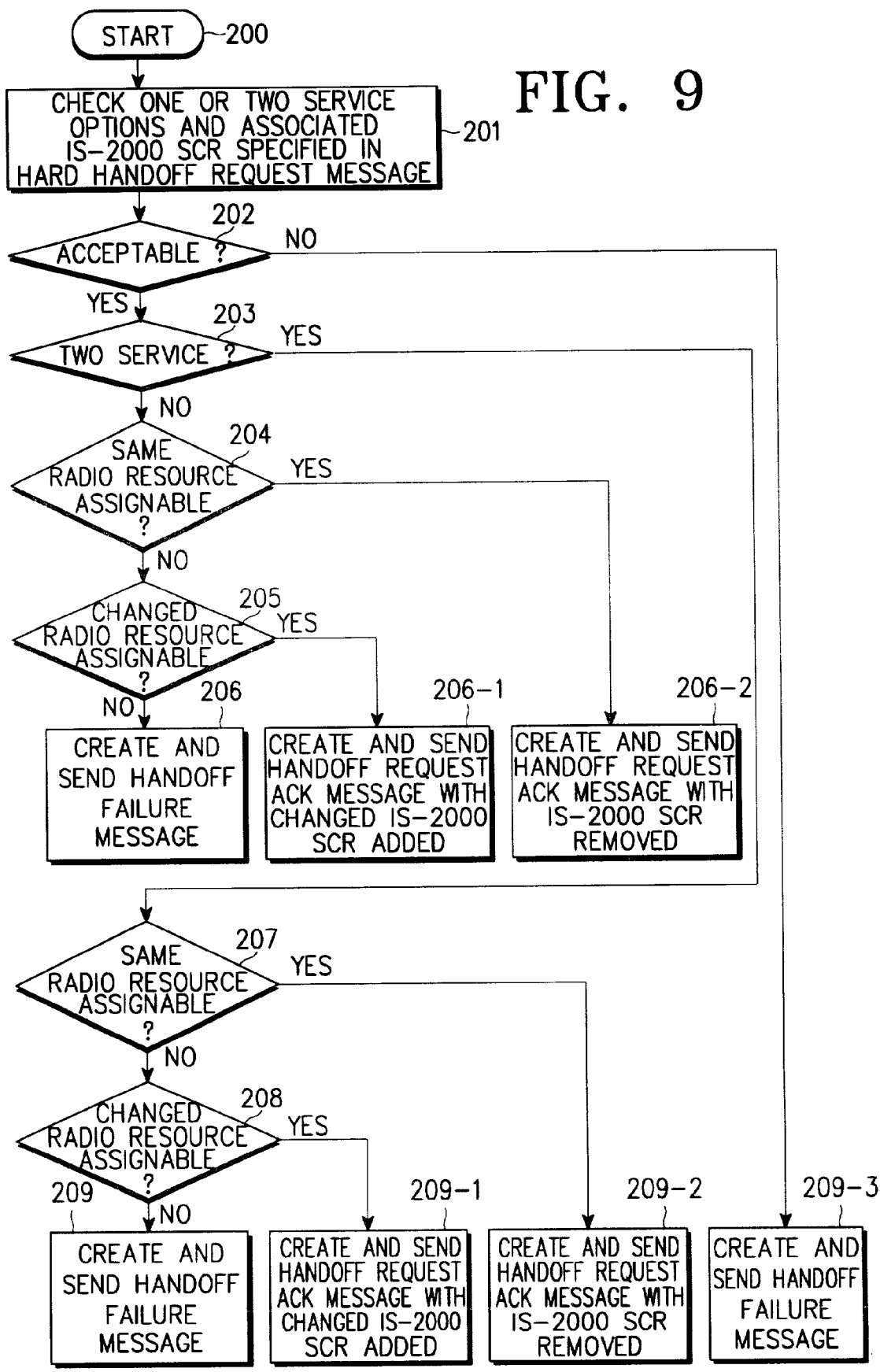
FIG. 9 is a flow chart illustrating a procedure for processing a handoff request message for the concurrent service, received from the MSC, in the target base station during a handoff according to an embodiment of the present invention.

FIG. 9 illustrates a procedure for processing a handoff request message for the concurrent service, received from the MSC, in the target base station during a handoff according to an embodiment of the present invention.

Referring to FIG. 9, in step 201, the target base station checks one or two service options and the IS-2000 Service Configuration Record, specified in the handoff (HHO) request message received from the mobile switching center MSC. In step 202, the target base station determines whether it is possible to accept a handoff. If it is possible to accept a handoff in step 202, the target base station determines in step 203 whether the number of the services required by the mobile switching center is two.

If the number of the services required by the mobile switching center is not two but one in step 203, the target base station determines in step 204 whether it is possible to assign the same radio resource as that specified in the handoff request message to the corresponding BTS with regard to one service required by the MSC. If it is not possible to assign the same resource in step 204, the target base station determines in step 205 whether it is possible to assign a radio resource by allowing a change in the IS-2000 Service Configuration Record (SCR). If it is not possible to assign a radio resource by allowing a change in the Service Configuration Record in step 205, the target base station creates a handoff failure message with a Cause value indicating non-assignability of the corresponding radio resource, and then sends the created handoff failure message to the mobile switching center MSC in step 206.

If it is possible to assign the radio resource by allowing a change in the Service Configuration Record in step 205, the target base station changes the IS-2000 Service Configuration Record within an assignable range, creates a handoff request Ack message with the changed IS-2000 Service Configuration Record added thereto, and sends the created handoff request Ack message to the MSC, in step 206-1.

If it is possible to assign the same radio resource in step 204, it means that it is possible to assign the same radio resource as that specified in the IS-2000 Service Configuration Record required by the MSC. Thus, in step 206-2, the target base station creates a handoff request Ack message with the IS-2000 Service Configuration Record removed, and then sends the created handoff request Ack message to the MSC.

If it is determined in step 203 that the number of services required by the MSC is two, the target base station performs steps 207, 208, 209, 209-1 and 209-2.

The target base station determines in step 207 whether it is possible to assign the same radio resource as that specified in the handoff request message to the corresponding BTS with regard to each of the two services required by the MSC. If it is not possible to assign the same resource in step 207, the target base station determines in step 208 whether it is possible to assign a radio resource by allowing a change in the IS-2000 Service Configuration Record (SCR). If it is not possible to assign a radio resource by allowing a change in the Service Configuration Record in step 208, i.e. when it is not possible to assign the radio resource for both the voice and the packet service, the target base station creates a handoff failure message with a Cause value indicating non-assignability of the corresponding radio resource, and then sends the created handoff failure message to the mobile switching center MSC in step 209.

If it is possible to assign the radio resource by allowing a change in the Service Configuration Record in step 208, i.e. when it is possible to assign the radio resource one of the first service and the second service, the target base station changes the IS-2000 Service Configuration Record within an assignable range, creates a handoff request Ack message with the changed IS-2000 Service Configuration Record added thereto, and sends the created handoff request Ack message to the MSC, in step 209-1. Here, that it is possible to assign the radio resource by allowing a change in the Service Configuration Record is equivalent to that it is possible to assign the radio resource for any one of the voice service and the packet service, since the target base station for the handoff cannot assign the same radio resource although the source base station has assigned the radio resources for both the voice service and the packet service before the handoff.

If it is possible to assign the same radio resource in step 207, i.e. when it is possible to assign the radio resources for both the first service and the second service, it means that it is possible to assign the same radio resource as that specified in the IS-2000 Service Configuration Record required by the MSC. Thus, in step 209-2, the target base station creates a handoff request Ack message with the IS-2000 Service Configuration Record removed, and then sends the created handoff request Ack message to the MSC. Here, that it is possible to assign the same radio resource means that it is possible to the radio resource for both the voice service and the packet service even in the target base station for the handoff, as in the source base station which assigns the radio resources for both the voice service and the packet service before the handoff.

Otherwise, if it is not possible to accept the handoff in step 202, the target base station creates a handoff failure message with a Cause value indicating unacceptability of the handoff, and then sends the created handoff failure message to the MSC, in step 209-3.

FIG. 10 illustrates a format of the handoff request message for the concurrent service according to an embodiment of the present invention. Such a handoff request message for the concurrent service is created in the mobile switching center and then transmitted to the target base station in accordance with the procedure shown in FIG. 9.

Referring to FIG. 10, the handoff request message for the concurrent service according to an embodiment of the present invention includes an information element for Message Type. Further, the handoff request message includes information elements for Channel Type, Encryption Information, Classmark Information Type 2, Cell Identifier List (Target), Circuit Identity Code Extension, IS-95 Channel Identity, Mobile Identity (IMSI: International Mobile Station Identity), Mobile Identity (ESN: Electrical Subscriber Number), and Downlink Radio Environment. Further, the handoff request message includes information elements for Service Option, CDMA Serving One Way Delay, IS-95 MS Measured Channel Identity, IS-2000 Channel Identity, and Quality of Service Parameters. In addition, the handoff request message includes information elements for IS-2000 Mobile Capabilities, IS-2000 Service Configuration Record, PDSN IP Address, Protocol Type, Packet Zone ID, and Service Option Connection Reference.

Similarly to the handoff required message for the concurrent service shown in FIG. 6, the handoff request message for the concurrent service according to an embodiment of the present invention includes the Service Option Connection Reference field and the IS-2000 Service Configuration Record field. The Service Option Connection Reference field and the IS-2000 Service Configuration Record field have the same functions as the Service Option Connection Reference field and the IS-2000 Service Configuration Record field in the handoff required message. Therefore, the detailed description of them will not be provided.

As described above, the present invention provides a handoff method in a mobile communication system concurrently supporting two services. The handoff method can seamlessly provide the concurrent service even when the mobile station moves from the source base station to the target base station adjacent to the source base station. In particular, when it is not possible to assign a radio resource for the two services during a handoff after analyzing the assignable radio resources, the target base station assigns the radio resource for at least one of the two services, thereby providing at least one service during the handoff.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a handoff on a concurrent service while a mobile station is concurrently provided with a first service and a second service through a first base station, in a mobile communication system including the mobile station, the first base station connected to the mobile station, a mobile switching center connected to the first base station, and a second base station adjacent to the first base station, the method comprising the steps of:

sending a handoff required message from the first base station to the mobile switching center according to signal strength reported from the mobile station, the signal strength exceeding predetermined strength of a pilot signal from the second base station, the handoff required message including service type identifiers indicating service types and resource information indicating radio resources assigned for the respective services;

receiving the handoff required message at the mobile switching center, and sending to the second base station a handoff request message including the service type identifiers and the resource information;

determining in the second base station whether it is possible to assign radio resources for both the first service and the second service, based on the resource information received from the mobile switching center;

sending a first handoff request acknowledge message with the resource information removed from the second base station to the mobile switching center, when it is possible to assign the radio resources for both the first service and the second service;

assigning in the second base station a radio resource for any one of the first service and the second service, and sending a second handoff request acknowledge message with the assigned radio resource to the mobile switching center, when it is possible to assign the radio resources one of the first service and the second service;

sending the first handoff request acknowledge message from the mobile switching center to the mobile station and forming in the mobile station a communication link to the second base station according to the first handoff request acknowledge message when it is possible to assign the radio resources for both the first service and the second service; and sending the second handoff request acknowledge message from the mobile switching center to the mobile station and forming in the mobile station a communication link to the second base station according to the second handoff request acknowledge message when it is not possible to assign the radio resources for both the first and second service.

2. The method as claimed in claim 1, further comprising the step of sending a handoff failure message indicating non-assignability of the radio resource to the mobile switching center, when it is not possible to assign the radio resources for both the first service and the second service.

3. The method as claimed in claim 1, wherein the service configuration record comprises resource information including a radio channel.

4. The method as claimed in claim 1, wherein the service configuration record comprises resource information including a data rate.

* * * * *